US012699522B2

(12) United States Patent
    Ahn et al.

(10) Patent No.:  US 12,699,522 B2
(45) Date of Patent:        Aug. 4, 2026

(54) STORAGE DEVICE THAT EXECUTES MIGRATING DATA AND OPERATING METHOD OF THE STORAGE DEVICE

(71) Applicant: SK hynix Inc., Gyeonggi-do (KR)

(72) Inventors: Young Ho Ahn, Gyeonggi-do (KR); Jae Youn Jang, Gyeonggi-do (KR); Jin Woo Kim, Gyeonggi-do (KR); Hyeong Ju Na, Gyeonggi-do (KR); Yoon Won Lee, Gyeonggi-do (KR); Jhu Yeong Jhin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 14 days.

(21) Appl. No.: 18/481,231

(22) Filed: Oct. 5, 2023

(65) Prior Publication Data

US 2024/0385763 A1      Nov. 21, 2024

(30) Foreign Application Priority Data

May 15, 2023      (KR) ........................ 10-2023-0062438

(51) Int. Cl.
    *G06F 3/06*                (2006.01)
(52) U.S. Cl.
    CPC .......... *G06F 3/0647* (2013.01); *G06F 3/0613* (2013.01); *G06F 3/0658* (2013.01); *G06F 3/0679* (2013.01)
(58) Field of Classification Search
    CPC .... G06F 3/0647; G06F 3/0613; G06F 3/0658; G06F 3/0679
    See application file for complete search history.

(56) References Cited

U.S. PATENT DOCUMENTS

| | | | |
|---|---|---|---|
| 9,354,955 B1 * | 5/2016 | Jones ................... | G06F 12/0253 |
| 11,216,369 B2 | 1/2022 | Davis et al. | |
| 11,789,864 B2 * | 10/2023 | Zhang ................. | G06F 11/3037 |
| | | | 711/154 |
| 2011/0225347 A1 * | 9/2011 | Goss .................... | G06F 12/0246 |
| | | | 711/170 |
| 2012/0311237 A1 * | 12/2012 | Park .................... | G06F 12/0246 |
| | | | 711/E12.008 |
| 2017/0083436 A1 * | 3/2017 | Jung ................... | G06F 12/0246 |
| 2017/0315891 A1 * | 11/2017 | Park ....................... | G11C 29/88 |
| 2019/0026224 A1 * | 1/2019 | Koo ....................... | G06F 9/4406 |
| 2019/0114258 A1 * | 4/2019 | Tsuchiyama ........ | G06F 11/1076 |
| 2020/0004670 A1 * | 1/2020 | Williams ........... | G11C 16/0483 |
| 2023/0205460 A1 * | 6/2023 | Ishihara .............. | G06F 12/0238 |
| | | | 711/154 |

FOREIGN PATENT DOCUMENTS

KR          10-1738965 B1      5/2017

OTHER PUBLICATIONS

The Linux Kernel, What Is Flash-Friendly File System (F2FS)?, Aug. 8, 2022, https://web.archive.org/web/20220808110755/https://docs.kernel.org/filesystems/f2fs.html (Year: 2022).*

* cited by examiner

*Primary Examiner* — Ryan Bertram
(74) *Attorney, Agent, or Firm* — IP & T GROUP LLP

(57)                ABSTRACT

A storage device may execute an operation of migrating valid data stored in one or more source data sections of a plurality of data sections to one or more destination data sections of the plurality of data sections in response to a request from an external device. When the valid data is migrated from the source data sections to the destination data sections, the storage device may execute an operation of writing meta data for the migrated valid data.

9 Claims, 9 Drawing Sheets determining one ore source data sections
and one or more destination data sections — S810 migrating valid data stored in the source
data sections to the destination data sections — S820

STORAGE DEVICE THAT EXECUTES MIGRATING DATA AND OPERATING METHOD OF THE STORAGE DEVICE

CROSS-REFERENCES TO RELATED APPLICATION

The present application claims priority under 35 U.S.C. 119 (a) to Korean patent application number 10-2023-0062438 filed on May 15, 2023, which is incorporated herein by reference in its entirety.

BACKGROUND

1. Technical Field

Various embodiments of the present disclosure generally relate to a storage device that executes migrating data, and operating method thereof.

2. Related Art

A storage device is a device which stores data on the basis of a request of an external device such as a computer, a mobile terminal such as a smartphone and a tablet, or various electronic devices.

The storage device may include a controller for controlling a memory (e.g., a volatile memory/a nonvolatile memory). The controller may receive a command from the external device, and may execute or control an operation for reading, writing or erasing data with respect to the memory included in the storage device, on the basis of the received command.

Furthermore, data stored in a specific area in the memory may be migrated to another area in the memory. For example, when data is updated in a specific area or a background operation for the data is executed, the data may be migrated to another area.

SUMMARY

Embodiments of the present disclosure may provide a storage device capable of generating sufficient space to store user data more quickly, and operating method of the storage device.

In one aspect, embodiments of the present disclosure may provide a storage device including a memory including a plurality of data sections, and a controller configured to execute, in response to a request from an external device, migrating valid data stored in one or more source data sections among the plurality of data sections to one or more destination data sections among the plurality of data sections. The controller is configured to write, when the valid data is migrated from the source data sections to the destination data sections, meta data for the migrated valid data to the memory.

In another aspect, embodiments of the present disclosure may provide an operating method of a storage device including determining one or more source data sections and one or more destination data sections among a plurality of data sections included in a memory, and migrating, in response to a request from an external device, valid data stored in the source data sections to the destination data sections. In this case, the migrating the valid data may include writing, when the valid data is migrated from the source data sections to the destination data sections, meta data for the migrated valid data to the memory.

In another aspect, embodiments of the present disclosure may provide a system including a storage device including a plurality of data sections, and a host configured to control the storage device based on a Flash-Friendly File System (F2FS) scheme. In this case, the host may set a plurality of logical areas, migrate target data from M source logical areas among the plurality of logical areas to N target logical areas among the plurality of logical areas while host garbage collection is being executed, M and N are natural numbers and N being less than or equal to M, and execute, when migrating the target data between the logical areas is completed, a checkpoint operation to store in the storage device meta data for the target data. The storage device may migrate the target data from source data sections, which correspond to the M source logical areas among the plurality of data sections, to destination data sections, which correspond to the N target logical areas among the plurality of data sections, and store therein the meta data when migrating the target data between the data sections is completed.

In another aspect, embodiments of the present disclosure may provide a storage device including a memory including first and second sections each configured to store data therein, and a controller configured to migrate the data from the first section to the second section, and store, in the memory, meta data of the migrated data. The controller is further configured to hold, even when the migrating is completed, a program operation on the first section until the storing of the meta data is completed.

According to embodiments of the present disclosure, it is possible to generate sufficient space to store user data more quickly.

DETAIL DESCRIPTION

Figure 1:
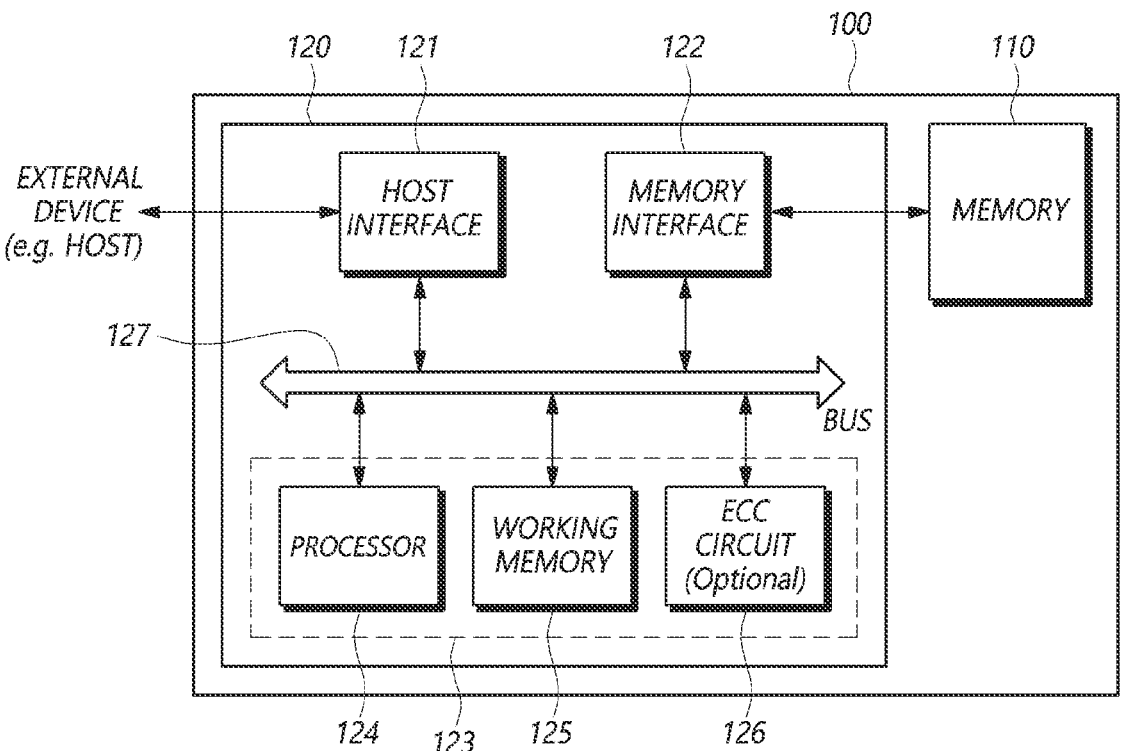
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the present disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may implemented as a three-dimensional array structure. For example, embodiments of this disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. Namely, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in description, descriptions will describe the controller 120 and the host as devices that are separated from each other.

Referring to FIG. 1, the controller 120 may include a memory interface 122 and a control circuit 123, and may further include a host interface 121.

The host interface 121 may provide an interface for communication with the host. For example, the host interface 121 may provide an interface that uses at least one of various communication standards or interfaces such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may be configured to provide an interface between the memory 110 and the controller 120 in response to the control of the control circuit 123.

The control circuit 123 may perform the general control operations of the controller 120 to control the operation of the memory 110. To this end, for instance, the control circuit 123 may include a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of this disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one of a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one of an SRAM (static RAM), a DRAM (dynamic RAM) and an SDRAM (synchronous DRAM). Meanwhile, the controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in last read data. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
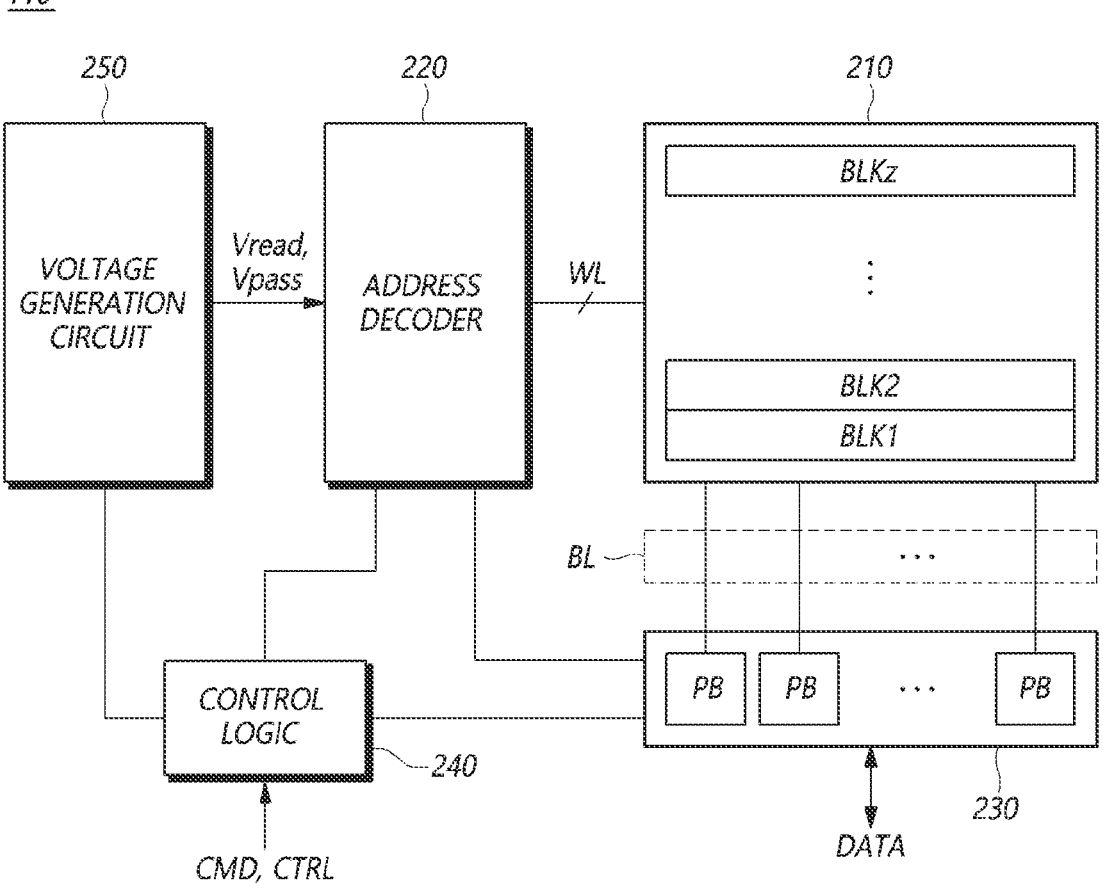
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of this disclosure may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
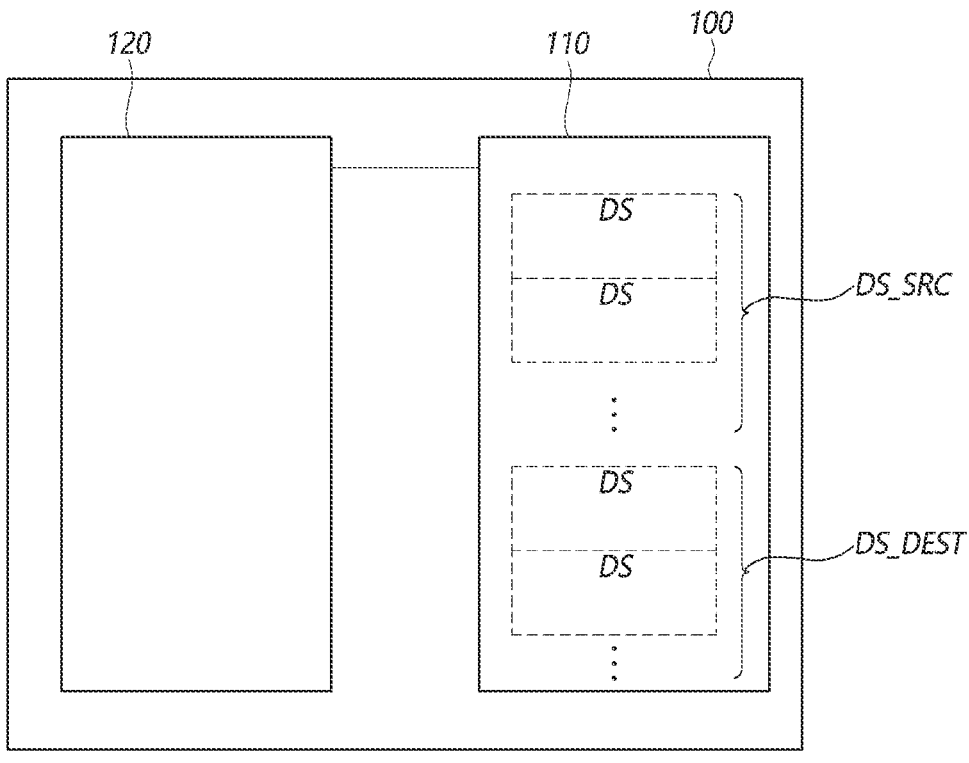
FIG. 3 illustrates schematic structures of a storage device according to embodiments of the present disclosure.

FIG. 3 illustrates schematic structures of the storage device 100 according to embodiments of the present disclosure.

Referring to FIG. 3, the storage device 100 may include a memory 110 and a controller 120.

The memory 110 may include a plurality of data sections DS. Each of the plurality of data sections DS is a space capable of storing data, and may also be referred to as a zone or an area. In this case, the storage capacity of the plurality of data sections DS may be the same (e.g., 2 MB)

For example, each of the plurality of data sections DS may include one or more memory blocks or one or more pages.

The controller 120 may execute migrating valid data stored in one or more source data sections DS_SRC among the plurality of data sections DS to one or more destination data sections DS_DEST among the plurality of data sections DS. The migration may be executed in response to a request of an external device (not shown) located outside the storage device 100.

Hereinafter, in FIG. 4, the operation of the controller 120 will be described in more detail.

Figure 4:
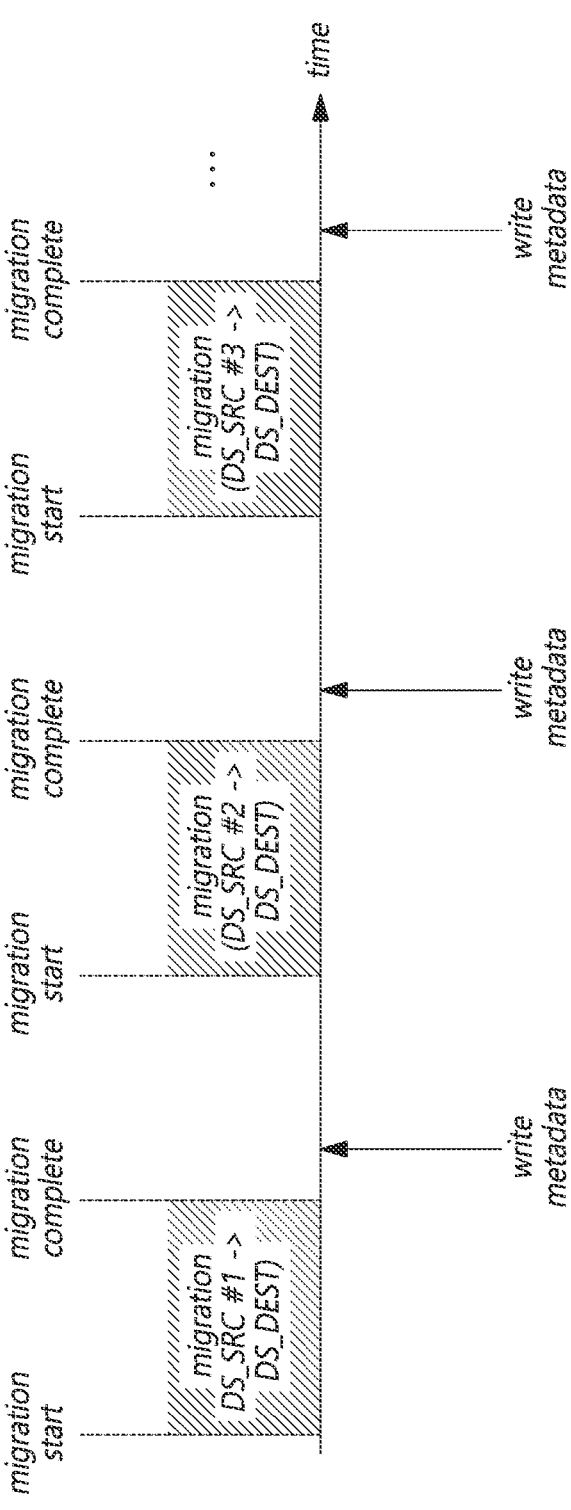
FIG. 4 illustrates an operation of a storage device according to embodiments of the present disclosure.

FIG. 4 illustrates an operation of the storage device 100 according to embodiments of the present disclosure.

Referring to FIG. 4, the controller 120 of the storage device 100 may write, when the valid data stored in the source data sections DS_SRC is migrated to the destination data sections DS_DEST, meta data (e.g., journal data, map data and so forth) for the migrated valid data to the memory 110. An operation of writing meta data for the valid data to the memory 110 may be referred to as a checkpoint operation for the valid data.

Due to the migration of the valid data, meta data of the valid data may be changed. The controller 120 may write the changed meta data to the memory 110. The controller 120 may store the changed meta data as a journal. After an operation of writing the meta data for the migrated valid data is completed, the source data sections in which the valid data is stored may be erased and new data can be stored in the source data sections.

When valid data stored in the source data sections is migrated to the destination data sections DS_DEST, the valid data may be migrated to only one of the destination data sections DS_DEST or may be distributed to two or more of the destination data sections DS_DEST.

In FIG. 4, the controller 120 may migrate the valid data stored in #1 of the source data sections DS_SRC to the destination data sections DS_DEST and may execute an operation of writing meta data for the valid data to the memory 110.

The controller 120 may migrate the valid data stored in #2 of the source data sections DS_SRC to the destination data sections DS_DEST and may execute an operation of writing meta data for the valid data to the memory 110.

The controller 120 may migrate the valid data stored in #3 of the source data sections DS_SRC to the destination data sections DS_DEST and may execute an operation of writing meta data for the valid data to the memory 110.

In this way, the controller 120 may execute writing meta data to the memory 110 whenever valid data stored in the source data sections DS_SRC is migrated to the destination data sections DS_DEST and can more quickly generate a space where a user can use in the storage device 100. This is because the source data sections can be immediately used to store new data immediately after the data stored in the source data sections is migrated to the destination data sections DS_DEST.

Hereinafter, an operation of the controller 120 of the storage device 100 migrating valid data stored in the source data sections DS_SRC to the destination data sections DS_DEST will be described in detail.

Figure 5:
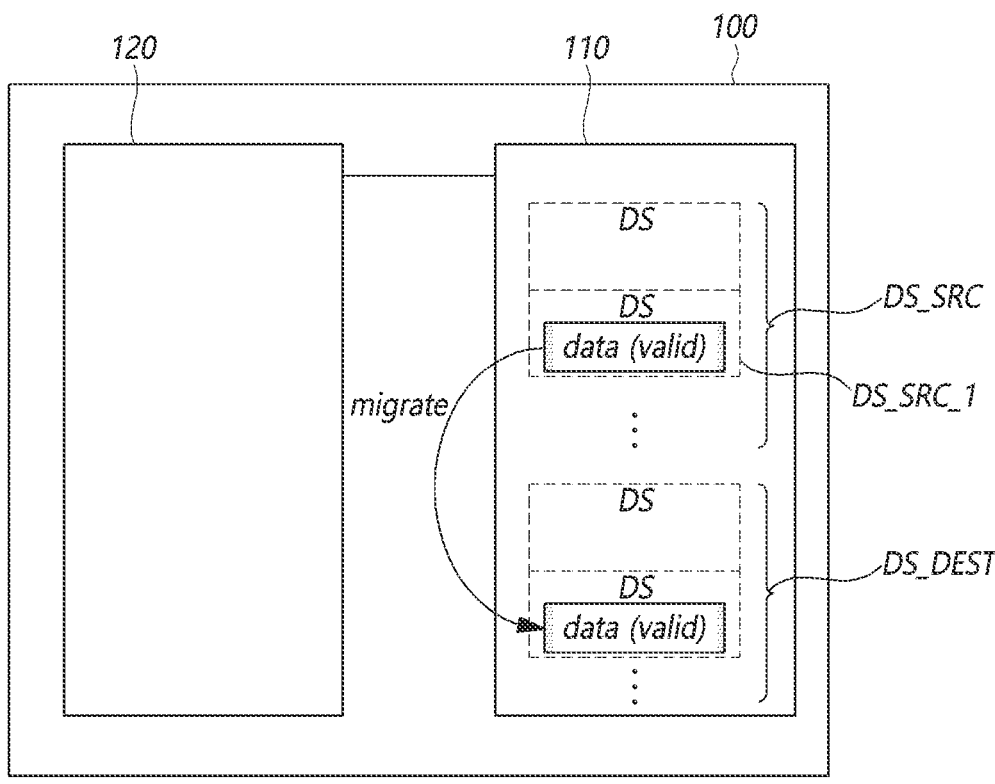
FIG. 5 illustrates an operation in which a storage device migrates valid data stored in a first source data section according to embodiments of the present disclosure.

FIG. 5 illustrates an operation in which a storage device 100 migrates valid data stored in a first source data section DS_SRC_1 according to embodiments of the present disclosure.

Referring to FIG. 5, the controller 120 of the storage device 100 may migrate valid data stored in the first source data section DS_SRC_1 among the source data sections DS_SRC to the destination data sections DS_DEST.

In FIG. 5, the case of migrating valid data stored in the first source data section DS_SRC_1 to one of the destination data sections DS_DEST has been described as an example, but the valid data stored in the first source data section DS_SRC_1 may be distributed to two or more of the destination data sections DS_DEST.

When the controller 120 migrates the valid data stored in the first source data section DS_SRC_1 to the destination data sections DS_DEST, the state of the first source data section DS_SRC_1 may be changed. Hereinafter, this will be described in detail in FIG. 6.

Figure 6:
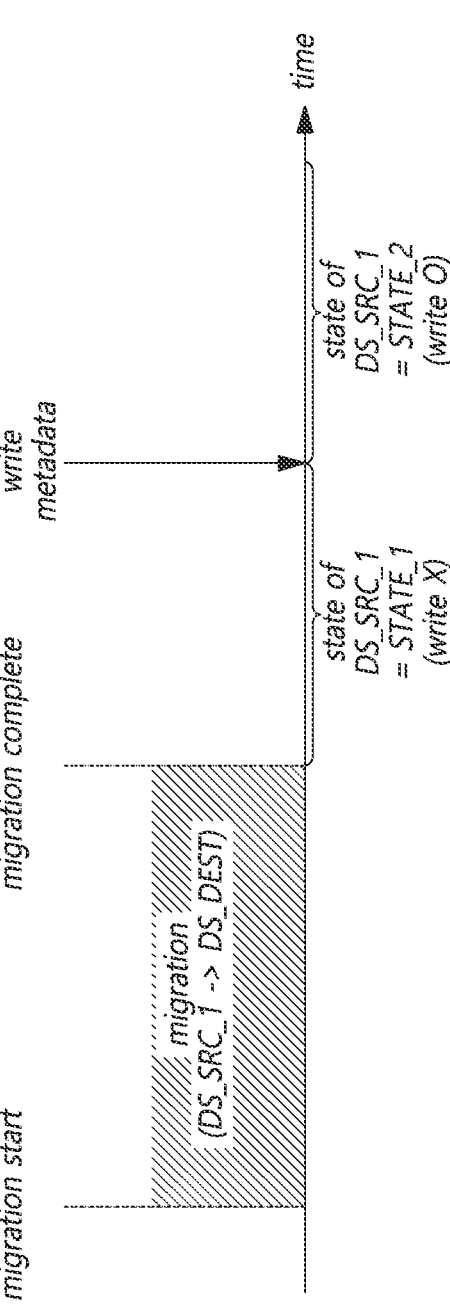
FIG. 6 illustrates an operation in which a storage device changes a state of a first source data section according to embodiments of the present disclosure.

FIG. 6 illustrates an operation in which a storage device 100 changes a state of a first source data section DS_SRC_1 according to embodiments of the present disclosure.

Referring to FIG. 6, the controller 120 of the storage device 100 may set the state of the first source data section DS_SRC_1 to a first state STATE_1 after all valid data stored in the first source data section DS_SRC_1 is migrated to the destination data sections DS_DEST.

The controller 120 may set the state of the first source data section DS_SRC_1 to a second state STATE_2 after the operation of writing the changed meta data for the valid data migrated from the first source data section DS_SRC_1 to the destination data sections DS_DEST in the memory 110 is completed.

In this case, the controller 120 may prohibit writing data to the first source data section DS_SRC_1 when the first source data section DS_SRC_1 is in the first state STATE_1, and may allow erasing and writing data on the first source data section DS_SRC_1 when the first source data section DS_SRC_1 is in the second state STATE_2.

In the embodiments of the present disclosure, the reason why writing data to the first source data section DS_SRC_1 is prohibited when the first source data section DS_SRC_1 is in the first state STATE_1 is as follows.

When the first source data section DS_SRC_1 is in the first state STATE_1, valid data is migrated to the destination data sections DS_DEST, but the changed meta data for the valid data is not written to the memory 110 yet. In the first state STATE_1, the controller 120 stores the meta data in the working memory 125, but the meta data has not yet been written to the memory 110. Accordingly, when power off occurs, the meta data stored in the working memory 125 may be lost.

Meanwhile, the meta data may indicate mapping information between logical address and physical address for valid data. When the valid data is migrated from the first source data section DS_SRC_1 to the destination data sections DS_DEST, a physical address corresponding to the valid data may be changed and the map data may indicate the changed physical address.

Therefore, if it is allowed to write new data to the first source data section DS_SRC_1 in the first state STATE_1, not only new data but also the valid data migrated to the destination data sections DS_DEST may not be restored when Sudden Power Off (SPO) occurs while writing the new data to the first source data section DS_SRC_1 in the first state STATE_1.

Therefore, data writing to the first source data section DS_SRC_1 may be prohibited in the first state STATE_1 in order to restore the valid data migrated to the destination data sections DS_DEST through original valid data still stored in the first source data section DS_SRC_1 even if SPO occurs.

Figure 7:
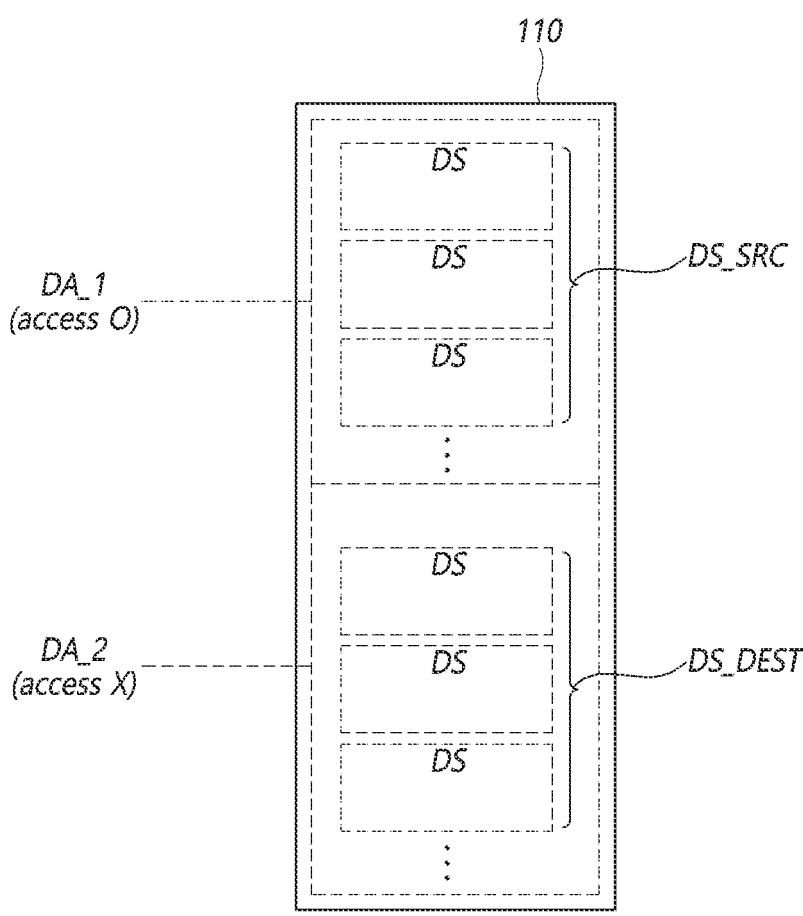
FIG. 7 illustrates a state in which a plurality of data sections are classified according to embodiments of the present disclosure.

FIG. 7 illustrates a state in which a plurality of data sections DS are classified according to embodiments of the present disclosure.

Referring to FIG. 7, the controller 120 of the storage device 100 may classify the plurality of data sections DS into a first data area DA_1 and a second data area DA_2. In this case, the plurality of data sections DS may be included in the first data area DA_1 or the second data area DA_2, respectively.

The first data area DA_1 may be accessible by an external device (e.g., host) located outside the storage device 100. The external device may write data to the first data area DA_1 and read data from the first data area DA_1 based on a predetermined file system scheme (e.g., the Flash-Friendly File System (F2FS) scheme).

On the other hand, the second data area DA_2 may be a reserved space for executing a background operation (e.g., garbage collection, wear leveling, read reclaim and so forth). Unlike the first data area DA_1, the second data area DA_2 may be inaccessible by the external device. The second data area DA_2 may be an overprovisioning area.

The first data area DA_1 and the second data area DA_2 may be dynamically changed. For example, when user data is migrated to a data section included in the second data area DA_2, the data section may be included in the first data area DA_1. As another example, among data sections included in the first data area DA_1, a data section from which data has been erased may be included in the second data area DA_2.

In FIG. 7, the source data sections DS_SRC may be included in the first data area DA_1, and the destination data sections DS_DEST may be included in the second data area DA_2. After the data stored in the source data sections DS_SRC is migrated to the destination data sections DS_DEST, the source data sections DS_SRC may be included in the second data area DA_2 and the destination data sections DS_DEST may be included in the first data area DA_1.

Furthermore, the size of the second data area DA_2 to the size of the first data area DA_1 may vary according to a set reference ratio.

The controller 120 may adjust the reference ratio to additionally generate a free data section, among the plurality of data sections DS, capable of storing new data. The controller 120 may convert the data section, among the plurality of data sections DS, in the second state STATE_2 into a free data section by executing an erase operation on the data section in the second state STATE_2. For example, the controller 120 may set the reference ratio so that the storage capacity of free data sections created by executing a migration operation is greater than the storage capacity of free data sections used when executing the migration operation described above.

Figure 8:
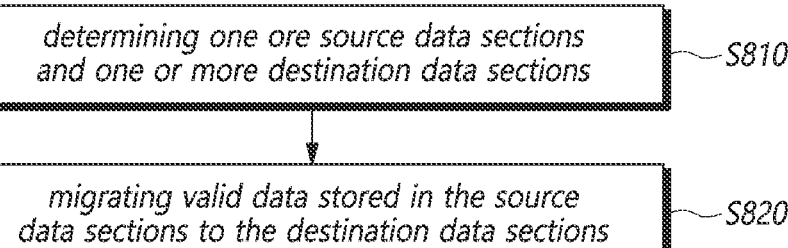
FIG. 8 illustrates an operating method of a storage device according to embodiments of the present disclosure.

FIG. 8 illustrates an operating method of a storage device 100 according to embodiments of the present disclosure.

Referring to FIG. 8, the operating method of the storage device 100 may include determining one or more source data sections DS_SRC and one or more destination data sections DS_DEST among a plurality of data sections DS included in the memory 110 (S810).

The operating method of the storage device 100 may include migrating, in response to the request of the external device, valid data stored in the source data sections DS_SRC to the destination data sections DS_DEST (S820).

The operation S820 may include writing, when valid data stored in the source data sections DS_SRC is migrated to the destination data sections DS_DEST, meta data for the migrated valid data to the memory 110. As described above, before the meta data is to be written to the memory 110, the controller 120 may store the meta data in the working memory 125.

The meta data may indicate mapping information between logical address and physical address for the valid data. When the valid data is migrated from the first source data section DS_SRC_1 to the destination data sections DS_DEST, a physical address corresponding to the valid data may be changed, and the map data may indicate the changed physical address.

The operation S820 may include setting a state of the first source data section DS_SRC_1 among the source data sections DS_SRC to the first state STATE_1 after all valid data stored in the first source data section DS_SRC_1 is migrated to the destination data sections DS_DEST, and setting the state of the first source data section DS_SRC_1 to the second state STATE_2, after the writing of the meta data on the valid data migrated from the first source data section DS_SRC_1 to the destination data sections DS_D-EST to the memory 110 is completed.

Writing data to the first source data section DS_SRC_1 may be prohibited when the first source data section DS_SRC_1 is in the first state STATE_1, and writing data to the first source data section DS_SRC_1 may be allowed when the first source data section DS_SRC_1 is in the second state STATE_2.

Each of the plurality of data sections DS may be included in the first data area DA_1 or the second data area DA_2. The first data area DA_1 is accessible by the external device located outside the storage device 100, and the second data area DA_2 is a reserved space for executing a background operation.

In this case, the source data sections DS_SRC may be included in the first data area DA_1, and the destination data sections DS_DEST may be included in the second data area DA_2.

Figure 9:
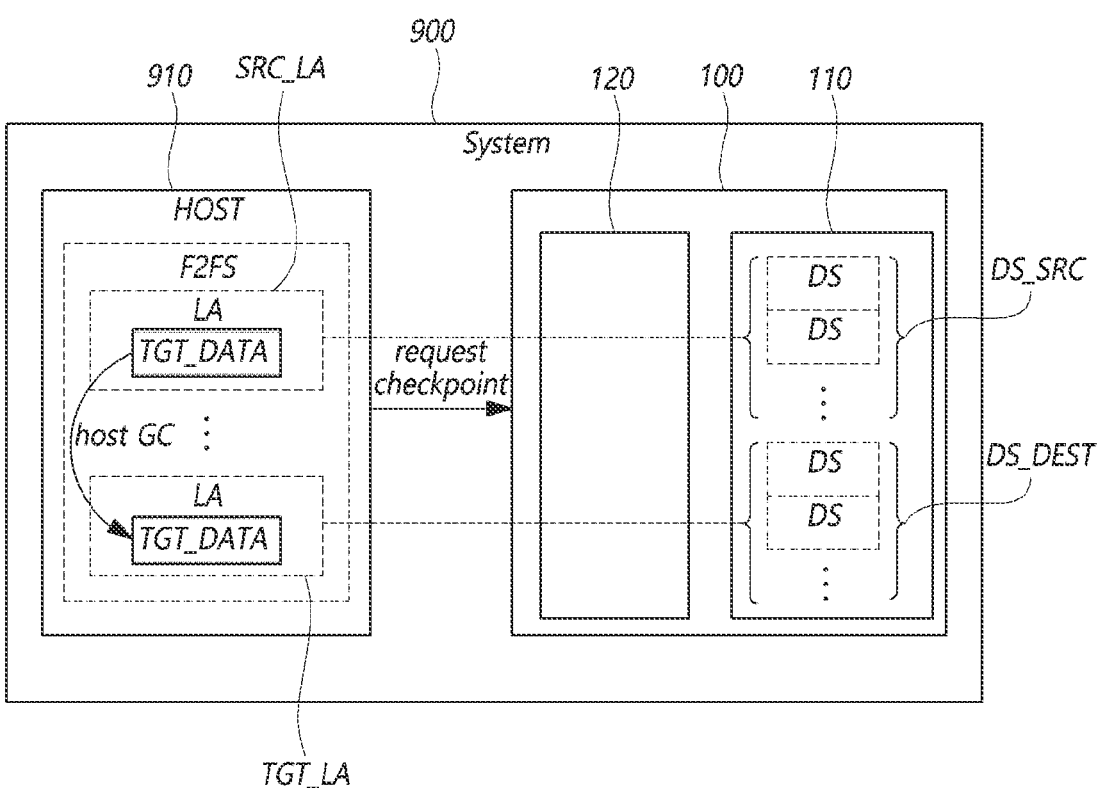
FIG. 9 illustrates schematic structures of a system according to embodiments of the present disclosure.

FIG. 9 illustrates schematic structures of a system 900 according to embodiments of the present disclosure.

Referring to FIG. 9, the system 900 may include the aforementioned storage device 100 and a host 910.

The host 910 may control the storage device 100 based on the F2FS scheme. That is, the host 910 may manage a file based on the F2FS scheme and store data corresponding to the file in the storage device 100. Also, the host 910 may control the storage device 100 to execute an operation of accessing the file. For example, the host 910 may transmit a command instructing a specific operation (e.g., read, write or erase operation) to the storage device 100 to control the storage device 100.

In FIG. 9, the host 910 may set a plurality of logical areas LA. Each of the plurality of logical areas may be mapped to one or more data sections.

In FIG. 9, the host 910 may execute a host garbage collection. While the host garbage collection is being executed, the host 910 may migrate target data TGT_DATA stored in M source areas SRC_LA of the plurality of logical areas LA to N target logical areas TGT_LA, where M is a natural number and N is a natural number less than or equal to M.

In this case, when the host 910 completes an operation of migrating data stored in the source logical area SRC_LA to the target logical area TGT_LA while the host garbage collection is being executed, the host 910 may execute a checkpoint operation which stores meta data for the target data TGT_DATA in the storage device 100. When the checkpoint operation is executed, the meta data stored in the working memory 125 of the storage device 100 may be stored in the memory 110 of the storage device 100.

Based on the request of the host 910, the storage device 100 may store, when valid data stored in the source data sections DS_SRC corresponding to the M source logical areas SRC_LA is migrated to the destination data sections DS_DEST corresponding to the N target logical areas TGT_LA, the meta data for the migrated valid data.

In this case, the host 910 may set, after data stored in a first source logical area among the M source logical areas SRC_LA is migrated to the N target logical areas TGT_LA, the state of the first source logical area to a write-protected state, and set, after a checkpoint operation on data migrated from the first source logical area to the N target logical areas TGT_LA is completed, the state of the first source logical area to a writable state.

Although embodiments of this disclosure have been described for illustrative purposes, those skilled in the art will appreciate that various modifications, additions and substitutions are possible, without departing from the scope and spirit of this disclosure. Therefore, the embodiments disclosed above and in the accompanying drawings should be considered in a descriptive sense only and not for limiting the technological scope. The technological scope of this disclosure is not limited by the embodiments and the accompanying drawings. The spirit and scope of this disclosure should be interpreted in connection with the appended claims and encompass all equivalents falling within the scope of the appended claims. Furthermore, the embodiments may be combined to form additional embodiments.

What is claimed is:

1. A storage device comprising:

a memory including a plurality of data sections; and a controller configured to:

execute, in response to a request from an external device, migrating valid data stored in one or more source data sections among the plurality of data sections to one or more destination data sections among the plurality of data sections, and write, when the valid data is migrated from the source data sections to the destination data sections, meta data for the migrated valid data to the memory, wherein the controller is further configured to divide the plurality of data sections into a first data area accessible by the external device and a second data area which is reserved for a background operation and inaccessible by the external device, wherein the source data sections are included in the first data area, wherein the destination data sections are included in the second data area, wherein after a) the valid data has been migrated from the source data sections to the destination data sections and b) after meta data for the valid data migrated from the source data sections to the destination data sections has been written to the memory, the source data sections from which the valid data has been migrated are available to store new data, after the valid data has been migrated from the source data sections to the destination data sections, the controller sets a state of the source data sections to a first state prohibiting writing of the new data to the source data sections until the meta data for the valid data migrated from the source data sections to the destination data sections has been written to the memory, and after the meta data for the valid data migrated from the source data sections to the destination data sections has been written to the memory, the controller sets the state of the source data sections to a second state permitting the writing of the new data to the source data sections.

2. The storage device according to claim 1, wherein the controller is further configured to:

set a first source data section among the source data sections to the first state after all valid data is migrated from the first source data section to the destination data sections, and set the first source data section to the second state after writing meta data on the valid data migrated from the first source data section to the destination data sections to the memory is completed.

3. The storage device according to claim 2, wherein the controller is further configured to:

prohibit the writing of the new data to the first source data section when the first source data section is in the first state, thereby preventing loss of the meta data when power off occurs, and allow the writing of the new data to the first source data section when the first source data section is in the second state.

4. A method for operating a storage device, the method comprising:

determining one or more source data sections and one or more destination data sections among a plurality of data sections included in a memory; and migrating, in response to a request from an external device, valid data stored in the source data sections to the destination data sections, wherein source data sections from which the valid data has been migrated are available to store new data after a) the valid data has been migrated from the source data sections in an area reserved for background operations to the destination data sections in another area accessible by the external device and b) after meta data for the migrated valid data has been written to the memory, after the valid data has been migrated from the source data sections to the destination data sections, the controller sets a state of the source data sections to a first state prohibiting writing of the new data to the source data sections until the meta data for the valid data migrated from the source data sections to the destination data sections has been written to the memory, and after the meta data for the valid data migrated from the source data sections to the destination data sections has been written to the memory, the controller sets the state of the source data sections to a second state permitting the writing of the new data to the source data sections.

5. The method according to claim 4, wherein the migrating the valid data comprises:

setting a first source data section among the source data sections to the first state after all valid data is migrated from the first source data section to the destination data sections;

setting the first source data section to the second state after writing meta data on the valid data migrated from the first source data section to the destination data sections to the memory is completed; and dividing the plurality of data sections into a first data area accessible by the external device or a second data area which is reserved for a background operation and inaccessible by the external device, wherein the source data sections are included in the first data area, wherein the destination data sections are included in the second data area, and wherein, when the valid data is migrated from the source data sections to the destination data sections, the source data sections are included in the second data area and the destination data sections are included in the first data area.

6. The method according to claim 5, further comprising:

prohibiting the writing of the new data to the first source data section when the first source data section is in the first state, thereby preventing loss of the meta data when power off occurs; and allowing the writing of the new data to the first source data section when the first source data section is in the second state.

7. The method according to claim 4, further comprising dividing the plurality of data sections into a first data area accessible by the external device or a second data area which is reserved for a background operation, wherein the source data sections are included in the first data area, and wherein the destination data sections are included in the second data area.

8. A system comprising:

a storage device including a plurality of data sections; and a host configured to control the storage device based on a Flash-Friendly File System (F2FS) scheme;

wherein the host is further configured to:

set a plurality of logical areas, migrate target data from M source logical areas among the plurality of logical areas to N target logical areas among the plurality of logical areas while host garbage collection is being executed, M and N are natural numbers and N being less than or equal to M, and execute, when migrating the target data between the logical areas is completed, a checkpoint operation to store in the storage device meta data for the target data, and wherein the storage device is configured to:

migrate the target data from source data sections, which correspond to the M source logical areas among the plurality of data sections, to destination data sections, which correspond to the N target logical areas among the plurality of data sections, and store therein the meta data when migrating the target data between the data sections is completed, wherein the storage device includes a first data area accessible by the host and a second data area which is reserved for a background operation and inaccessible by the host, wherein the source data sections are included in the first data area, wherein the destination data sections are included in the second data area, wherein a) after the valid data is migrated from the source data sections to the destination data sections and b) after meta data for the valid data migrated from the source data sections to the destination data sections has been written to the memory, the source data sections from which the valid data has been migrated are available to store new data, after the valid data has been migrated from the source data sections to the destination data sections, the controller sets a state of the source data sections to a first state prohibiting writing of the new data to the source data sections until the meta data for the valid data migrated from the source data sections to the destination data sections has been written to the memory, and after the meta data for the valid data migrated from the source data sections to the destination data sections has been written to the memory, the controller sets the state of the source data sections to a second state permitting the writing of the new data to the source data sections.

9. The system according to claim 8, wherein the host is further configured to:

set, after the target data is migrated from a first source logical area among the M source logical areas to the N target logical areas, the first source logical area to a write-protected state, and set, after a checkpoint operation on the target data migrated from the first source logical area to the N target logical areas is completed, the first source logical area to a writable state.

\* \* \* \* \*